(12) United States Patent
Edwards

(10) Patent No.: US 8,195,152 B1
(45) Date of Patent: Jun. 5, 2012

(54) ERI (ENHANCED ROAMING INDICATOR) IMPLEMENTATION

(75) Inventor: Chris Michael Edwards, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 999 days.

(21) Appl. No.: 12/042,006

(22) Filed: Mar. 4, 2008

(51) Int. Cl.
*H04W 4/00* (2009.01)
*H04W 24/00* (2009.01)
*H04M 1/00* (2006.01)

(52) U.S. Cl. .................. 455/432.1; 455/566; 455/432.2; 455/432.3; 455/456.1

(58) Field of Classification Search .... 455/432.1–432.3, 455/433, 456.1–456.6, 457, 566, 158.4; 715/722, 715/864
See application file for complete search history.

(56) References Cited

U.S. PATENT DOCUMENTS

| 6,363,251 | B1 * | 3/2002 | Huang et al. | 455/432.1 |
| 6,993,336 | B2 * | 1/2006 | Aerrabotu et al. | 455/437 |
| 2008/0085705 | A1 * | 4/2008 | Uchida | 455/432.1 |
| 2008/0146223 | A1 * | 6/2008 | Welnick et al. | 455/434 |

* cited by examiner

*Primary Examiner* — Rafael Pérez-Gutiérrez
*Assistant Examiner* — Thai Vu

(57) ABSTRACT

Systems, products, and methods are disclosed for identifying a roaming indicator to be displayed on a mobile device that is in a given roaming situation and for determining a set of services that are available to the device. One variation of the method includes encoding within an ERI (enhanced roaming indicator) property two values that are respectively defined in a first portion of the ERI property and a second portion of the ERI property. The first portion of the ERI describes a visual roaming indicator that is to be presented on a mobile device. The second portion of the ERI describes a set of services that are available to the mobile device. A decoding method includes identifying an ERI value that is applicable given the roaming status, referencing a binary version of the ERI value, and inspecting a designated portion of the ERI value that indicates which services of the set of services are available.

18 Claims, 3 Drawing Sheets

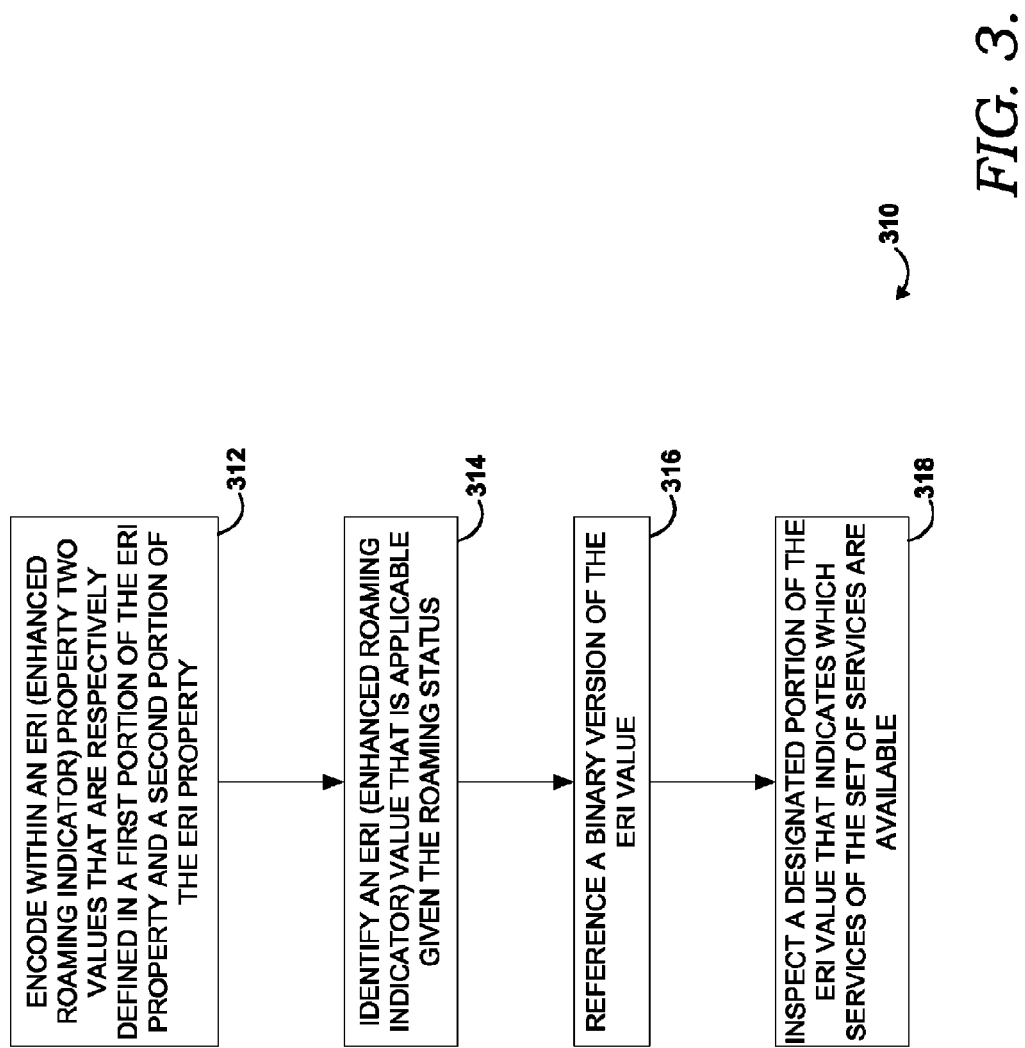

ERI (ENHANCED ROAMING INDICATOR) IMPLEMENTATION

SUMMARY

Embodiments of the present invention are defined by the claims below. But summarily, embodiments provide a way to better use an ERI property to indicate banner text and display icons as well as to indicate what services are available when a mobile device is roaming.

In a first illustrative aspect, a method (or device capable of performing a method) for enabling a communications provider to uniformly designate services that are available to a mobile device in a roaming context. The method includes encoding within an ERI (enhanced roaming indicator) property two values that are respectively defined in a first portion of the ERI property and a second portion of the ERI property. The first portion of the ERI describes a visual roaming indicator that is to be presented on a mobile device, and the second portion of the ERI describes a set of services that are available to the mobile device.

In a second illustrative aspect, an embodied data structure enables an identification of both (1) a roaming indicator to be displayed on a mobile device that is in a given roaming situation and (2) a set of services that are available to the device. The data structure includes a first portion that is made up of a first set of bits that defines a banner to be displayed on the mobile device. The banner is a visual indication of a roaming status of the mobile device. A second portion is made up of a second set of bits that indicate an availability of a service that is available by way of the mobile device in light of the roaming status.

In a final illustrative aspect, a method of determining a set of services available to a mobile device that is in a roaming status is provided. The method includes identifying an ERI (enhanced roaming indicator) value that is applicable given the roaming status, referencing a binary version of the ERI value, and inspecting a designated portion of the ERI value that indicates which services of the set of services are available.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 depicts an illustrative method of uniformly designating and decoding such banner identifiers and service-availability identifiers according to an embodiment of the present invention.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
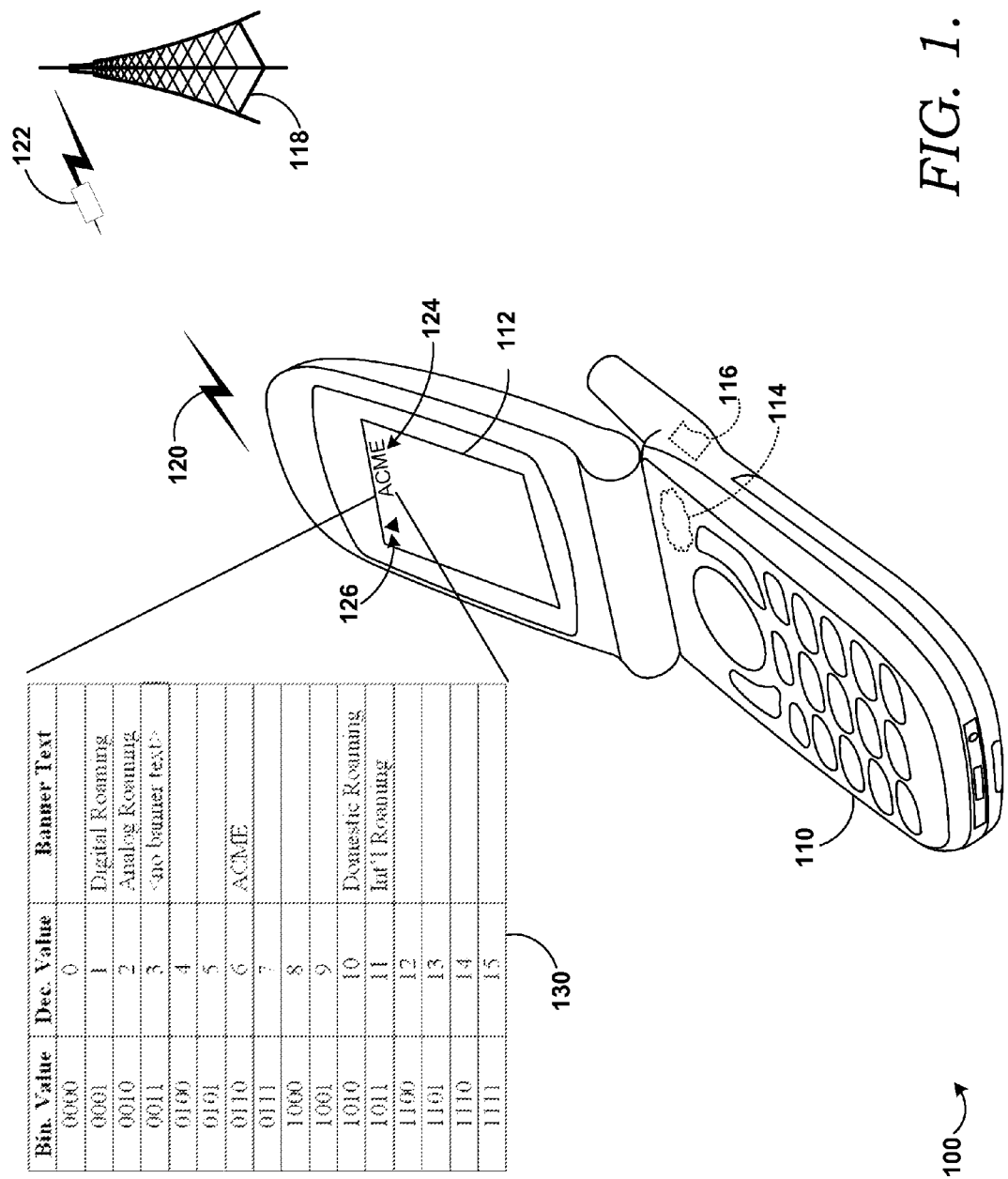
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 includes a mobile device 110, which includes a display 112, a set of computer usable instructions 114 to help carry out various aspects of the invention, as well as a preferred roaming list (PRL) 116. A PRL is a database that resides in mobile device 110 that contains information to be used as mobile device 110 acquires service from a telecommunications network.

Many devices associated with a wireless-communications network are not shown, so as to not obscure the present invention, but a tower 118 is shown as being able to establish a wireless communications link 120. In one embodiment, a system identification 122 is broadcast. Mobile device 110 can receive a system identification 122 and use it to reference PRL 116 to determine an appropriate enhanced roaming indicator (ERI).

Banner text 124 is also illustratively shown on FIG. 1 as well as a roaming icon 126. Those skilled in the art will appreciate that banner text 124 is text that can be shown while a mobile device is in a certain roaming situation. Illustrative roaming situations include digital roaming, analog roaming, domestic roaming, and international roaming.

Banner text 124 can also show the name of another carrier or content provider. By way of example, "Acme" is shown, which represents the name of a carrier other than the carrier that normally provides nonroaming service to mobile device 110. Icon 126 can actually be one or more icons and serves as another visual queue to the user that mobile device 110 has entered a roaming status. Thus, visual indications of a roaming status can include icon 126 and/or banner text 124. As will be explained in greater detail below, the actual visual indication provided on display 112 (which may include either or both of icon 126 and text 124) is determined from values in a table such as that referenced by numeral 130 in one embodiment.

Currently, ERI values are eight bit values, and all eight bits are used to encode a single value, which is a decimal value, which attempts to map to a status display and to provide some level of indication of services that are available. Currently, there is little logic that goes into creating a table of ERI values. That is, they are almost haphazardly listed. ERI values can range from zero to 255. Each number between zero and 255 corresponds to a single encoded value, which forms a portion of a record of a table that includes all other values explicitly defined. All entries of the table must be explicitly defined.

In the historic form, there is nothing standard or uniform throughout the different ERI decimal values. This format uses a single value to attempt to describe banner text to be displayed on a mobile device and in some situations at least a portion of services that might be available to the mobile device. And to use the prior scheme, a mobile device would have to store a table that listed values for all of the different ranges of ERI values from zero to 255. Even then, a detailed, express listing of services available (such as data services, enhanced data services, messaging services such as Short Messaging Services (SMS), and Multimedia Messaging Services (MMS), wireless data roam guard, etc.) are not explicitly defined. That is, there is no way to glean directly from the ERI what set of services are available to a device in a roaming scenario. Rather, an ERI value has to be interpreted and then that value has to be looked up on a table, and then that table must be inspected to determine the correct record, which must then be evaluated to try to determine whether certain desired information is even present, which it might not be because of the lack of uniformity of the table and of what is to be encoded in the ERI.

According to an embodiment of the present invention, a method is provided for enabling a communications provider to uniformly and expressly designate services that are available in a roaming context. Instead of encoding an ERI as a single value, two values are encoded within it, including a banner-identification value and a service-availability value. The term "encoded" should not necessarily be confused with encrypting or even a high form of encoding a thing. As used herein, representing a thing (e.g., a number or a character) in binary form is encoding that thing.

The service-availability value of the present invention can be interpreted as a string of on/off bit indicators that indicate the availability of certain services. Thus, the ERI value itself directly conveys information about services that are (and thus, are not) available in a given roaming situation. According to an embodiment of the present invention, an ERI value can be received as a decimal value, if necessary converted to its binary equivalent, wherein a first portion is utilized for banner identification and a second portion is utilized for service availability. Each of these two portions are independent of the other such that either can be determined without knowing the other. This will be most easily explained with reference to a specific example.

Figure 2:
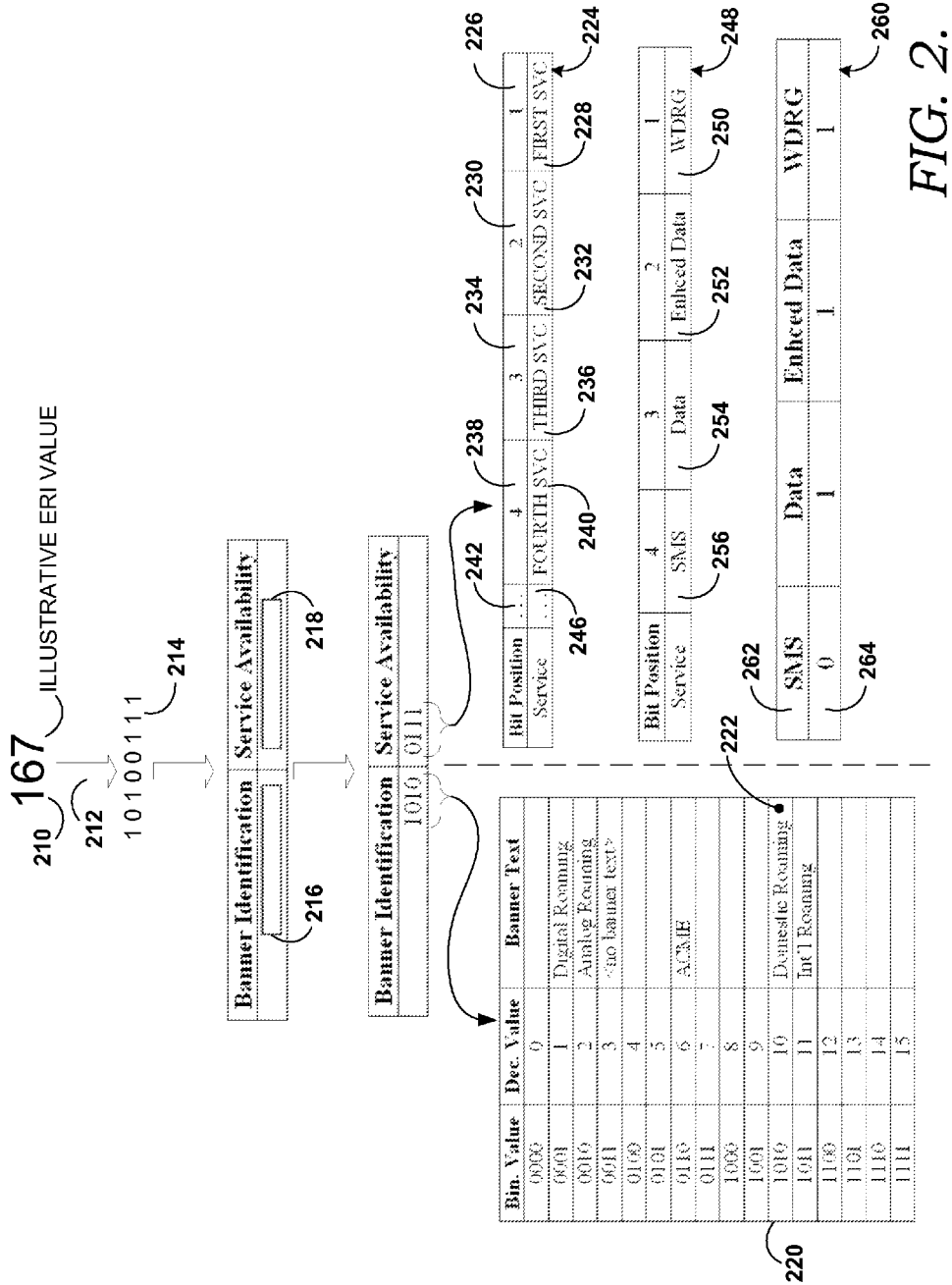
FIG. 2 depicts diagrams to illustrate an example of determining banner identifiers and service-availability identifiers according to an embodiment of the present invention.

Turning now to FIG. 2, a series of steps and outcomes are shown in connection with a specific example of an embodiment of the present invention where an ERI value 210 is interpreted. For purposes of this example, illustrative ERI value 210 takes on the decimal value of "167." If need be, at a step 212, a binary equivalent 214 value is determined from the decimal value of the ERI. In other embodiments, the ERI value is received as a binary, and that binary value is preserved or in other embodiments is not converted to its decimal equivalent as the case may be.

As shown in FIG. 2, the binary equivalent of "167" is "10100111" and is referenced by numeral 214. This value 214 is really two values composed of a first portion 216 and a second portion 218. First portion 216 will indicate a visual queue to be represented on a mobile device that indicates a roaming status of the mobile device. Second portion 218 will provide a way to indicate which of a set of services are available.

In some embodiments, first portion 216 and second portion 218 are symmetrical in size. In other embodiments, they are asymmetrical. That is, first portion 216 might include only as many bits as options for different visual indications are desired. If only two different visual indications of a roaming status are desired, then first portion 216 would be composed of only one bit. If four options for providing visual indications of a roaming status are desired, then first portion 216 would contain two bits. For this illustrative example, it is assumed that four bits will be used to designate a desired visual roaming indicator on mobile device 110. Thus, the four remaining bits are used to indicate different service-availability options.

Accordingly, continuing with the example of FIG. 2, a banner and identification of "1010" corresponds to row 220, and a banner text of "domestic roaming." Thus in this example, "domestic roaming" will be presented on the display 112 of mobile device 110. Of course if the entire text does not fit, then an abbreviation or some other variation of the text can be presented. As noted, the identification of this banner text 222 is capable of being performed irrespective of the remaining portion 218. This would be impossible in the prior art because in the prior art, the entire ERI value encodes only a single value, and the complete value is necessary in order to identify a specific record in a table of ERI values to determine a desired banner text.

Regarding determining service-availability options, note on the example in FIG. 2 that "0111" is the value of second portion 218, which is used to determine service-availability options according to an embodiment of the present invention. Table 224 is not necessarily a real table that exists in mobile device 110. Rather, it is shown here for explanatory purposes to help explain that a certain bit position corresponds to a certain service.

For example, a first bit position 226 corresponds to a first service 228. Thus, if the value in first bit position 226 is a "1" then that would indicate that first service 228 is available in the given roaming context, or roaming status. Similarly, a second bit position 230 corresponds to a second service offering such that a certain value in second bit position 230 indicates whether second service 232 is available or not. Of course a "1" does not necessarily need to indicate the presence of a service, but might. Third bit position 234 corresponds to a third service option 236, and a fourth bit position 238 corresponds to a fourth service offering 240. If additional bits were set aside to indicate additional service offerings then these would be carried out in like a manner in the spaces referenced by numerals 242 and 246.

Table 248 shows some illustrative services that might correspond to different bit positions. It should be noted that an array of different services can be designated as available. Only a few illustrative services are shown. The illustrative services shown include a "wireless data roam guard" feature 250, an enhanced-data option 252, a data option 254, and a messaging option 256. WDRG option 250 provides for the ability to guard against unintended use of wireless data services while in a roaming state. It may be the case that some third parties do not provide the ability to notify a user that the user is about to engage in a use of wireless data services while in its roaming context. But for those that do, this feature 250 would indicate the same. Enhanced-data option 252 would indicate that the provider of roaming services would also provide enhanced-data options.

Illustrative enhanced-data options include the ability to send picture mail, watch television, download videos, download music, and the like. If a roaming provider provides the ability to engage in such services, then a "1" can reside in the second bit position. Data indicator 254 indicates that a roaming provider can provide data services. Illustrative data services include receiving email or browsing the Internet for example. Others in the art may not separate or distinguish between data services and enhanced-data services. The two are shown separate for illustrative purposes. Messaging option 256 is an option that indicates an availability to mobile device 110 that messaging services can be utilized by way of the mobile device. Two illustrative messaging services include SMS and MMS, which are Short Messaging Service and Multimedia Messaging Service respectively.

Table 260 shows an example of the value "0111" that is applicable to the instant example. Recall that "0111" is the set of bits that are included in second portion 218, which enable an identification of services that are available by way of a mobile device such as mobile device 110, which can be any type of communications device that is capable of communicating by way of a wireless network including a phone or smartphone or PDA and the like. Using the illustrative values in table 248 and table 260, one would interpret "0111" as indicating that messaging services are not available, while data, enhanced data, and WDRG services are available because the value corresponding to "SMS" 262 is zero 264, and the others are ones.

Turning now to FIG. 3, an illustrative method of enabling a communications provider to uniformly designate services that are available in a roaming context is provided and referenced generally by the numeral 310. At a step 312, an enhanced roaming indicator property is encoded with two values that are respectively defined in a first portion of the ERI property and also in a second portion of the ERI property. With reference to FIG. 2, an example of this is shown by numerals 216 and 218, which respectively correspond to a first portion of an ERI property and a second portion of the ERI property. Although the examples shown define the banner identification as being first, it could be second if desired. In one embodiment, the first portion of the ERI describes a visual roaming indicator that is presented on a mobile device, and the second portion of the ERI describes the set of services that is available to the mobile device. As mentioned, examples of a visual roaming indicator can include displaying an icon such as icon 126, the icon in various states such as solid colored or blinking, and/or text such as text 124 shown on FIG. 1, which can also assume various states such as different colors, blinking, etc. In one embodiment, first portion 216 includes a first set of bits, and a second portion 218 includes a second set of bits.

Each portion is independently discernable irrespective of whether the other is known. Some illustrative text options that might be displayed include an indication of digital roaming, analog roaming, domestic roaming, international roaming, and an identification of another service provider. For example, if mobile device 110 is associated with a home network, but a user of mobile device 110 travels to a different country, then perhaps one option of text 124 to be displayed might be an indication of that foreign provider.

When interpreting an ERI, a device will identify an ERI at a step 314 that is applicable given the roaming status of device 110. In one embodiment, system identification 122 provides a reference in preferred roaming list 116 that allows an identification of the proper ERI value given a roaming status, which is implicitly indicated by system identification 122, which is broadcast by a communications network.

At a step 316, a binary version of the ERI value is referenced. In some embodiments, conversion of a decimal ERI value might be necessary, but in other embodiments, the ERI value can be received and preserved in binary format. At a step 318, a designated portion of the ERI property is inspected because it indicates which services are available by way of handset 110. This can be implemented in a uniform format because each bit corresponds to a specific service. That is, each bit in second portion 218 indicates either the availability or unavailability of a given service.

Some vendors may decide to not employ this embodiment of the present invention because they think that it might limit the number of either services or banner-identification options that can be designated. For example, some service providers may not wish to set aside only four bits to indicate service-availability options because doing so would only allow one to indicate the availability of four services. Of course, an embodiment of the present invention includes utilizing five or even six or more bits to indicate services that are available by way of mobile device 110.

In this way, mobile device 110 can determine whether a certain service is available by merely inspecting a single bit of an ERI value without having to interpret the entire thing and cross-reference a long table. Similarly, if a new service is to be identified, then this can happen relatively painlessly because a former service can be replaced with a new service to be identified.

Employing an embodiment of the present invention will forgo a need to store a table that explicitly lists all ERI values and their corresponding banner texts and their corresponding icon-display options. Rather, a certain set of bits (e.g., second portion 218) operates as on/off switches that indicate an availability or unavailability of services in a given roaming context. Examples of different roaming contexts can include when a mobile device is being serviced by an analog portion of its own carrier, being serviced by an international carrier, or being serviced by some other carrier other than its home carrier.

Many different arrangements of the various components depicted, as well as components not shown, are possible without departing from the spirit and scope of the present invention. For example, one of the bits in either the first portion or second portion of the ERI can be designated as indicating a presentation mode of display icon 126 or banner text 124, such as "1" indicates flashing, or a color change, or something along those lines. And of course the present invention is not limited to ERI values that are only 8 bits long. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of enabling a communications provider to uniformly designate services that are available in a roaming context, the method comprising:

encoding within an 8-bit ERI (enhanced roaming indicator) property two values that are respectively defined in a first, 4-bit portion of the 8-bit ERI property and a second, 4-bit portion of the 8-bit ERI property, wherein the first 4-bit portion of the ERI describes a visual roaming indicator that is to be presented on a mobile device, and wherein the second 4-bit portion of the ERI describes a set of services that are available to the mobile device.

2. The media of claim 1, wherein the first portion of the ERI property is independently decodable such that even if the second portion of the ERI property is not known, then the visual roaming indicator would still be discernible.

3. The media of claim 1, wherein the second portion of the ERI property is independently decodable such that even if the first portion of the ERI property is not known, then the set of services are discernible.

4. The media of claim 1, wherein the visual roaming indicator includes one or more of an icon and text, and wherein a formatting of said icon can be dictated by one or more bits of said first portion, and wherein said formatting includes a flashing state.

5. The media of claim 4, wherein the text includes an indication of one or more of the following:
- digital roaming;
- analog roaming;
- domestic roaming;
- international roaming; and
- an identification of another service provider.

6. The media of claim 1, wherein the set of services includes one or more of the following:
- voice;
- data;
- enhanced data;
- wireless data roam guard (WDRG); and
- a messaging service including SMS and MMS.

7. One or more non-transitory computer-readable media having a data structure embodied thereon for enabling an identification of both (1) a roaming indicator to be displayed on a mobile device that is in a given roaming situation and (2) a set of services that are available to the device, the data structure comprising:
- a first portion of an 8-bit string comprising an enhanced roaming indicator (ERI) that is made up of a first set of four bits that defines a banner to be displayed on the mobile device, the banner being a visual indication of a roaming status of the mobile device;
- a second portion of the 8-bit string comprising the ERI that is made up of a second set of four bits, wherein each bit of the second set of four bits indicates an availability of a service that is available by way of the mobile device in light of the roaming status.

8. The media of claim 7, wherein the banner is a message that includes an indication of one or more of the following:
- digital roaming;
- analog roaming;
- domestic roaming;
- international roaming; and
- a hosting carrier that is different from a native carrier that normally services the mobile device.

9. The media of claim 7, wherein the first set of bits is a first identifier that is independent of the second set of bits such that if the second set of bits was unknown, then the availability of the banner would still be discernible.

10. The media of claim 7, wherein the second set of bits is a second identifier that is independent of the first set of bits such that if the first set of bits was unknown, then the availability of the service would still be discernible.

11. A method of determining a set of services available to a mobile device that is in a roaming status, the method comprising:
- identifying an ERI (enhanced roaming indicator) value that is applicable given the roaming status;
- referencing a binary version of the ERI value, wherein the binary version of the ERI value has a first four-bit portion that describes a visual roaming indicator and a second four-bit portion that describes a set of services; and
- inspecting the second portion of the ERI value that indicates which services of the set of services are available.

12. The method of claim 11, wherein identifying the ERI includes referencing a preferred roaming list (PRL) of the mobile device to determine the ERI.

13. The method of claim 12, wherein the identifying further includes referencing a system identification (SID) value that is broadcast to the mobile device to determine the ERI.

14. The method of claim 11, wherein inspecting the designated portion includes inspecting one or more bits that make up the designated portion, wherein each of the one or more bits corresponds to a service that might be available to the mobile device.

15. The method of claim 14, wherein the service that might be available to the mobile device includes one or more of:
- a call-guard service;
- a data service;
- an enhanced data service; and
- a messaging service.

16. The method of claim 15, wherein the messaging services includes one or more of:
- a short message services (SMS); and
- a multimedia message service (MMS).

17. The method of claim 11, further comprising determining a presentation to present on the mobile device that conveys a visual indication based on the roaming status.

18. The method of claim 17, wherein the determining the presentation includes referencing a second portion of the ERI value that is different from the designated portion.

* * * * *